US 9,240,891 B2

(12) United States Patent
Popp et al.

(10) Patent No.: US 9,240,891 B2
(45) Date of Patent: Jan. 19, 2016

(54) HYBRID AUTHENTICATION

(75) Inventors: Nicolas Popp, Menlo Park, CA (US); Siddharth Bajaj, San Francisco, CA (US); Phillip Martin Hallam-Baker, Medford, MA (US)

(73) Assignee: Symantec Corporation, Mountain View, CA (US)

( * ) Notice: Subject to any disclaimer, the term of this patent is extended or adjusted under 35 U.S.C. 154(b) by 1590 days.

(21) Appl. No.: 10/864,501

(22) Filed: Jun. 10, 2004

(65) Prior Publication Data

US 2005/0021982 A1 Jan. 27, 2005

Related U.S. Application Data

(60) Provisional application No. 60/477,405, filed on Jun. 11, 2003.

(51) Int. Cl.
*H04L 9/32* (2006.01)
*G06F 21/00* (2013.01)
*G06F 21/31* (2013.01)
*G06F 21/34* (2013.01)
*G06Q 20/34* (2012.01)
(Continued)

(52) U.S. Cl.
CPC .............. *H04L 9/3271* (2013.01); *G06F 21/00* (2013.01); *G06F 21/31* (2013.01); *G06F 21/34* (2013.01); *G06Q 20/341* (2013.01); *G06Q 20/3415* (2013.01); *G06Q 20/4097* (2013.01); *G06Q 20/40975* (2013.01); *G07F 7/1008* (2013.01); *H04L 9/3226* (2013.01); *G06F 2221/2103* (2013.01); *H04L 2209/56* (2013.01); *H04L 2209/80* (2013.01)

(58) Field of Classification Search
CPC ..... H04L 9/3271; H04L 9/3226; G06F 21/00; G06F 21/31; G06F 21/34; G06F 2221/2103
USPC ........... 713/172, 170, 178, 182–186; 455/1.2, 455/422.1, 403; 726/2, 5, 6, 18, 26; 380/30, 380/243, 278
See application file for complete search history.

(56) References Cited

U.S. PATENT DOCUMENTS 4,150,781 A * 4/1979 Silverman et al. ............ 235/382
5,420,922 A * 5/1995 Lundblad et al. ............. 380/243
(Continued)

FOREIGN PATENT DOCUMENTS

WO      WO 01/38950 A2    5/2001
WO      WO 03/032264 A2   4/2003

OTHER PUBLICATIONS

Beaulieu, S. "Extended Authentication within IKE (XAUTH)." Cisco Systems: Oct. 2001. http://www.tools.ieff.org/html/draft-beaulieu-ike-xauth-02.*

(Continued)

*Primary Examiner* — Kari Schmidt
(74) *Attorney, Agent, or Firm* — Lowenstein Sandler LLP

(57) ABSTRACT

A hybrid authentication device that has a keypad, a display, an electronic communications interface and a processor and memory that can be removable, such as a Subscriber Identity Module. The device can operate in a stand-alone mode, in which a user enters a personal identification number and challenge using the keypad, and the device generates a response. The device can also function as a smartcard, and can be electronically coupled to an external device using the communications interface.

19 Claims, 1 Drawing Sheet

(51) Int. Cl.
*G06Q 20/40* (2012.01)
*G07F 7/10* (2006.01)

(56) References Cited

U.S. PATENT DOCUMENTS

| | | | | |
|---|---|---|---|---|
| 5,734,718 | A * | 3/1998 | Prafullchandra | 713/183 |
| 5,907,616 | A * | 5/1999 | Brogger et al. | 713/172 |
| 6,173,400 | B1 * | 1/2001 | Perlman et al. | 713/172 |
| 6,460,138 | B1 * | 10/2002 | Morris | 713/184 |
| 6,615,171 | B1 * | 9/2003 | Kanevsky et al. | 704/246 |
| 6,647,493 | B1 * | 11/2003 | Occhipinti et al. | 713/170 |
| 6,970,068 | B1 * | 11/2005 | Pugel et al. | 340/5.65 |
| 6,993,658 | B1 * | 1/2006 | Engberg et al. | 713/185 |
| 2003/0087601 | A1 * | 5/2003 | Agam et al. | 455/39 |
| 2003/0105964 | A1 | 6/2003 | Brainard et al. | |
| 2004/0030932 | A1 * | 2/2004 | Juels et al. | 713/202 |
| 2004/0083296 | A1 * | 4/2004 | Metral | 709/229 |
| 2004/0088355 | A1 * | 5/2004 | Hagan et al. | 709/203 |
| 2004/0249503 | A1 * | 12/2004 | Sanchez | 700/237 |
| 2005/0044393 | A1 * | 2/2005 | Holdsworth | 713/200 |
| 2005/0195975 | A1 * | 9/2005 | Kawakita | 380/30 |

OTHER PUBLICATIONS

Centeno, Clara. "Securing Internet Payments". IPTS, Edifico Exp-WTC: Jan. 2002. ftp://ftp.jrc.es/pub/EURdoc/eur20263en.pdf.*

Synder, Joel M. "VPN Remote Access Authentication: Enabling Remote Access Without COmpromising Security." IPSec: Mar. 23, 2001.*

Jøsang, Audun, and Gunnar Sanderud. "Security in mobile communications: challenges and opportunities." Proceedings of the Australasian information security workshop conference on ACSW frontiers 2003—vol. 21. Australian Computer Society, Inc., 2003: (pp. 43-48).*

Tsai, Yuh-Ren, and Cheng-Ju Chang. "SIM-based subscriber authentication for wireless local area networks." Security Technology, 2003. Proceedings. IEEE 37th Annual 2003 International Carnahan Conference on. IEEE, 2003: (pp. 468-476).*

Menezes et al., "Handbook of Applied Cryptography". CRC Press. (pp. 394-400, 532, 546-550, 578-580). 1997.*

Supplemental Search Report of EP Application No. 04776431.1, mailed May 11, 2009, 3 pages total.

* cited by examiner

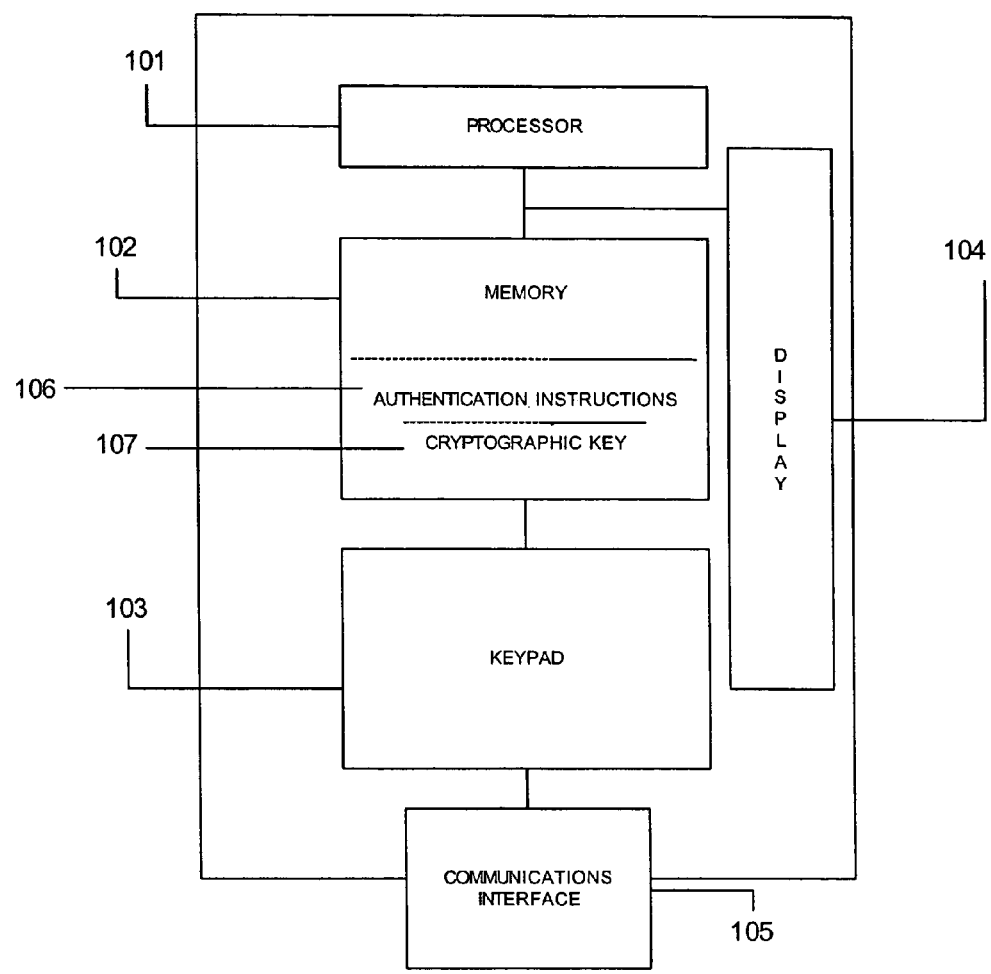

HYBRID AUTHENTICATION

CROSS REFERENCE TO RELATED APPLICATION

This application claims benefit of priority of U.S. Provisional Patent Application Ser. No. 60/477,405, filed Jun. 11, 2003.

FIELD OF THE INVENTION

Embodiments of the invention generally relate to authentication, and more particularly to a token for authenticating a user.

BACKGROUND

A token is a physical device that can be used for authenticating a user. For example, the SecurID token is manufactured by RSA Security, Inc. of Bedford, Mass. The SecurID token displays a unique code generated by the RSA SecurID or AES industry-standard hash algorithm in combination with the unique symmetric key contained in the token. Augmented by an internal clock, the algorithm generates a new authentication code every 60 seconds for the programmed life of the token. The RSA SecurID PINPad Card (SD520) permits the user to enter his Personal Identification Number ("PIN") via a 10-digit numeric keypad that is contained on the card. The code displayed is a hash-encrypted combination of the PIN and the current authenticator code. To be authenticated, the user provides the authentication code displayed on the SecurID token to an RSA ACE/Server. The ACE/Server already stores the PIN and symmetric key of each PINPad card and includes software that can generate the same authenticator codes as are generated by the tokens. If the authentication code from the token matches that generated by the ACE/Server for the given 60 second time period, then the user is authenticated by the ACE/Server.

Another type of token uses a challenge and a response to authenticate the user. The user receives a challenge from a server. The challenge can be a series of numbers resembling a telephone number. The user activates the token with a PIN and enters the challenge using a keypad on the token. The token applies a predetermined algorithm known by the server to the challenge, and generates and displays to the user a response. The user provides the response to the server, which internally generates its own version of the response, based upon it's preexisting knowledge of a key in the token, the PIN and the authentication code generation algorithm. If the user response provided to the server matches the anticipated response generated internally by the server, then the user is authenticated.

Hardware tokens such as the SecurID and the challenge-response token (hereinafter, "stand-alone hardware tokens") provide authentication, but cannot provide information to another party (such as the authenticating server) beyond that which can be entered by a user. For example, the SecurID token cannot provide a public key to the server. Likewise, the processing capability of stand-alone hardware tokens are oriented entirely towards generating a time-based or challenge-response authenticator. They cannot, for example, verify the signature of a message by using another's public key. They cannot securely store and provide sensitive information (e.g., a user's credit card number, medical information, etc.) because they cannot communicate electronically with another entity.

RSA also manufactures "software tokens." RSA SecurID Software Tokens use the same algorithms as RSA SecurID hardware tokens. Instead of residing within the plastic case of an RSA SecurID hardware token, the symmetric key is stored in a tamper-resistant fashion on a user's desktop, laptop, PDA, Smart Phone or Smart Card.

For example, the RSA SecurID software token for the Ericsson R380s cellular telephone is designed to authenticate valid network users. The RSA SecurID software for the Ericsson R380s generates a unique, unpredictable access code for secure network access. As for other RSA tokens, this code is combined with the user's secret PIN to create a dynamic code that is verified by the RSA ACE/Server software protecting the network. This constitutes a two-factor authentication system, where access to the network requires that the user prove he knows a given secret (such as a PIN) and also that he has a given item, such as a hardware or software token. Software tokens are generally only as secure as the platform on which they are installed. For example, if any tamper-resistant measures that may be applied to the memory of the Ericsson R380s can be breached, then the software token may subject to unauthorized modification. This could subvert the security of the software token, e.g., lead to the unauthorized disclosure of a secret key.

Yet another type of token is a smartcard. A smartcard can include a tamper-resistant processor and memory that can store a credential of the user, along with means to electronically communicate with another entity. An example of such a credential is a private key and a certificate associated with the user of the smartcard. The certificate can include the public key that corresponds to the user's private key; a user identifier; an expiration date; and other information. A smartcard can also store sensitive information (e.g., user medical information) with safeguards against unauthorized disclosure. A smartcard can communicate electronically by having electrical contacts suitable for connecting with a receiving device (a smartcard reader). A smartcard can also communicate with another device via wireless technology, e.g., over radio frequency waves. A smartcard can be used to authenticate a user by inserting it into a reader, or activating a wireless smartcard to communicate with a device. The receiving entity can require the user to input a shared secret, such as a PIN, to provide assurance that the user is utilizing his own smartcard, and not a stolen one. The smartcard (and by extension, its owner) can then be electronically authenticated by the receiving device.

A smartcard has more processing and storage capability than a stand-alone hardware token, but does not include a keypad. A user can provide input in conjunction with smartcard by connecting the smartcard to a reader that has a keypad. But there is no standalone keypad on the smartcard itself. The smartcard and reader combination lacks the portability of a smartcard alone or a stand-alone token.

BRIEF DESCRIPTION OF THE DRAWINGS

FIG. 1 shows an apparatus in accordance with an embodiment of the present invention.

DETAILED DESCRIPTION

An embodiment of the present invention provides a smartcard token with both a keypad and display. It provides the advantages of a stand-alone hardware token in terms of portability and stand-alone multi-factor authentication. But it's smartcard components can provide greater processing power and memory storage, making it more capable and flexible than stand-alone hardware tokens. It provides the advantages of a stand-alone software token because it can be used in conjunction with other hardware and software. But its security is not dependent upon the security of the platform in conjunction with which it is used, and therefore can be more secure than stand-alone software tokens. For example, it can apply its own tamper-resistant measures to its own processor, which can be more robust than the security of a processor on which a software token is installed. It provides the advantages of a smartcard because it can provide enhanced processing power and memory capacity. But it also provides greater portability by including an onboard keypad, display and the authentication features of stand-alone tokens, such as PIN-time-based authentication codes, PIN-based challenge-response mechanisms, etc.

An embodiment of the invention is shown in FIG. 1, which shows a secure processor 101 coupled to a secure memory 102. The secure processor 101 and memory 102 include tamper-resistant measures that prevent unauthorized access to and/or modification of the processor 101 and memory 102. Processor 101 is coupled to a keypad 103, a display 104 and a communications interface 105. The keypad 103 can be any suitable user input device, such as a membrane keypad, a keypad with more conventional buttons as are found on a telephone, a tablet with handwriting recognition capability, etc. The display 104 can be any suitable display device, such as a liquid crystal or plasma display. The communications interface 105 can be a set of electrical contacts adapted to be coupled to a suitable reader device. Communications interface 105 may also be a wireless transmitter. The processor 101 and memory 102 can be removable. For example, the processor 101 and memory 102 can include a Subscriber Identity Module (SIM), as is described at http://www.smarttrust.com/sim/default.asp. A SIM is a chip card that can be the size of a first class postage stamp. Like embodiments of the present invention having a fixed processor and/or memory, the SIM stores instructions adapted to be executed by the SIM processor to perform the method in accordance with an embodiment of the present invention. This method can include both smartcard functionality (e.g., verifying and creating digital signatures, authenticating the user, etc.) and stand-alone token functionality (e.g., generating PIN-enabled time-based authentication codes, generating PIN-enabled response codes for reply to authentication challenges, etc.)

SIMs can be used in Global System for Mobile (GSM) mobile phones. The use of a SIM chip advantageously adds a further dimension of portability to the present invention. A SIM can store a cryptographic key specific for a given individual, and can be moved from one device to another. For example, the SIM can be installed in a device to produce the smart token shown in FIG. 1. That is, the SIM can be inserted into a device that includes a keypad and display. Advantageously, the keypad and display need not be secure, because the SIM is tamper-resistant. Of course, the keypad and/or display can be made tamper-resistant if desired, and a processor and memory can also be included in the device to which a SIM is inserted.

In another embodiment, the SIM can be removed from the smart token shown in FIG. 1, and inserted into a preexisting device. For example, in one embodiment, the SIM can be inserted into a cellular telephone. The cellular telephone keypad and display provide the data input and display capability used to perform the method in accordance with an embodiment of the present invention. In yet another embodiment, the SIM can be inserted into a personal digital device. For example, the SIM can be provided as an SD expansion card for the 515m handheld made by Palm, Inc. The user can provide input through the 515m interface, which can function as a graphical user interface (e.g., a keypad, a menu, writing tablet with handwriting recognition software, etc.) that provides input and display functionality.

Memory 102 stores instructions 106 adapted to be executed by processor 101 to perform the method in accordance with an embodiment of the present invention. The instructions can provide stand-alone token and smartcard functionality in the same device. Memory 102 can also store cryptographic key 107.

Another embodiment offers dual mode functionality for accessing a Virtual Private Network ("VPN"). Often a user accesses a VPN from a terminal (e.g., PC, kiosk, etc.) that is not under the control of the owner of the VPN. In accordance with an embodiment of the present invention, when the user does not have access to a secure reader, the user is permitted to access the VPN by using the embodiment as a stand-alone token, e.g., by entering a user PIN and a challenge supplied by an authentication server, and providing a the response shown on the embodiment to the authentication server. When the user has access to a secure reader, the user need only couple the embodiment to the secure reader, enter a PIN, and the embodiment can be regularly authenticated (e.g., every ten seconds) by the authentication server during the session. In one version of this embodiment, the user is granted fewer access and/or modification ("access") privileges when using the embodiment in the stand-alone mode, and more when using it while connected, i.e., in the smartcard mode. This advantageously provides a single device that the user can use to authenticate himself to a VPN wherever he is, even if he is not at a trusted terminal.

In another embodiment, the user is required to successfully authenticate himself in stand-alone mode and to be approved, e.g., for access to a network. For example, the user must first be successfully authenticated in stand-alone mode to render a reader operable to authenticate the user in smartcard mode. In one embodiment, a trusted reader first authenticates the user by requiring the user to enter a correct PIN and response (or time-generated code) at the reader. If the user is not successfully authenticated by the reader, then the reader will not permit the user to be authenticated by the authentication server, even if the user has the correct smartcard. One way this can be implemented is by having a first PIN for stand-alone mode authentication and a second, different PIN for smartcard authentication. This "three-factor authentication" (the user must know two things and have one thing) in accordance with an embodiment of the present invention can advantageously provide more security in a single device than known two-factor authentication systems. The user can also be required to have the smartcard in regular communication with the authentication server, e.g., the authentication server must be able to authenticate the smartcard every 10 seconds. As soon as the smartcard cannot be authenticated (e.g., the user unplugs the smartcard from the reader), access to the network is terminated.

Another advantage of the present invention can be realized with an embodiment that permits the user and/or the authentication user to change the PIN associated with the embodiment by connecting it to the authentication server. In other words, the user can employ the embodiment in stand-alone mode and change the PIN by coupling the embodiment to a reader, authenticating himself to the authentication server, and setting a new PIN for the embodiment. It can be advantageous to change PINs to increase confidence in an authentication provided by the embodiment. A security policy can require that the user periodically (by number of authentications, amount of time elapsed since last PIN reset, set date and/or time, etc.) reset the PIN of an embodiment by coupling it to the authentication server (or other PIN-resetting computer). In one embodiment, the security policy requires that the PIN be reset before the expiration of a credit card number stored in memory of the embodiment. In another embodiment, the security policy requires that the PIN be reset whenever the embodiment (or a device in which an embodiment is embedded, such as a cellular telephone) is sold or otherwise transferred to another (e.g., rented). The cryptographic key for an embodiment can also be reset using a similar technique.

In yet another embodiment, several secrets (e.g., cryptographic keys, PINs, other information) can be stored in memory in the same device. Each secret can pertain to a different service that the user (the owner of the embodiment) can access. For example, a first key can in the embodiment can be used by a service provider such as America Online (AOL) to authenticate the user to use AOL services. Another key in the same device can be used to authenticate the user to access roaming services provided by a wireless telecommunications company. A third secret can be used to afford the user access to a company VPN. Another function can permit the user to authenticate himself to a credit card company using another PIN and stand-alone challenge-response (or time-code) authentication. Both smartcard and stand-alone features can advantageously be integrated into the same device.

At least some of the embodiments of the present invention can use SIMs, i.e., a processor coupled to memory that stores instructions adapted to be executed by the processor to perform the method in accordance with an embodiment of the present invention. This advantageously introduces a new degree of portability into authentication. A SIM can be used to perform stand-alone and smartcard authentication techniques in a cellular telephone, e.g., to authenticate the user as a condition of providing wireless services to the user. For example, when the user turns on his cell phone, the SIM can require the user to enter a PIN, and then provide a time-based code to the cellular network to authenticate the user. In the case of a rented cellular telephone, an embodiment of the present invention can authenticate the user as a condition to provisioning the telephone. For example, to provision a rented wireless phone, the renting party sets a PIN for the phone and tells the user. The user can be required to contact the service provider using a device other than the rented phone, such as calling on another telephone, accessing a web site, etc. The service needs to ascertain that the user knows the PIN and has physical possession of the phone. The user is provided with a challenge by the service, which he enters with his PIN into the rented phone. The SIM in the rented phone provides a response. The user provides the response to the service. If the service successfully authenticates the user, then the rented wireless phone is activated. Otherwise, wireless services are not provided to the rented wireless phone. The wireless phone can be permanently disabled after a predetermined number of unsuccessful authentication attempts.

The SIM can advantageously be removed from the phone and placed into other devices to authenticate the user to other, possibly unrelated, entities. For example, the user can remove the SIM from his wireless telephone and insert it into his laptop. In the laptop, the SIM can be used to authenticate the user to a wireless fidelity network, i.e., a Wi-Fi 802.11 network as described by the Wi-Fi Alliance, at a coffee shop. Thus, the same device can be used to authenticate the user to a cell network used principally for voice communications, and a Wi-Fi network used for data communications. The billing systems of both networks can use the authenticated identity of the user, as well as other information contained in the user's SIM (e.g., customer identifier, key, etc.) to consolidate billing to the user for both services into one bill. The capability of the SIM in accordance with an embodiment of the present invention can provide both stand-alone and smartcard functionality. The user can enter his PIN(s) through the keypad of his cellular telephone, the keyboard of his laptop, etc.

The authentication server can operate as a single computer or a set of computers. In one embodiment of the present invention, the authentication server can be a distributed system similar to the Domain Name System (DNS) that is used to resolve domain names into network addresses. For example, a request for challenge can be referred to another server in a distributed system, and then the evaluation of the response can be performed by the same or a different server from that which issued the challenge. In a stateless, distributed architecture, a request to evaluate a challenge and response, or a time-based response can be referred to the correct computer using an HTTP redirect or similar directive. The request message can contain a user identifier and a payload (such as a challenge-response pair, a PIN- and time-based authentication code, a key-based message, etc.) The request can be referred to another computer based upon the user identifier. The user identifier can be a Uniform Resource Identifier. In one embodiment, the user identifier is a URL. When the request is received by a first authentication server, the first computer determines the network address of a second authentication server that can further assess the request, and returns the network address of the second server to the user. The user then issues a second request to the second authentication server that includes at least part of the URL. This second server then implements the authentication method and can generate and send a response that indicates if the authentication is successful. The response can be sent to the user and/or another entity (e.g., a wireless service provider). In this way, the burden of assessing the validity of numerous requests for authentication is advantageously spread across a number of servers, thereby reducing the likelihood of system-wide performance problems and bottlenecks.

While a resource record in the DNS is fairly static, e.g., a static correlation of a name to a network address, the analogous structure in a distributed authentication scheme can be more dynamic. For a given user (e.g., user identifier), a record could include one or more PINs of the user; one or more keys stored on an embodiment of the present invention that belongs to the user; a network address of the user; one or more identifiers (or pointers) to the authentication algorithm(s) used by the embodiment; etc. The PINs, keys and algorithms can be correlated with each other (e.g., a given PIN is associated with a given algorithm) and/or a given service provider. They can also be associated with the network or other address to which the response to an authentication request are to be sent. For example, a user sends a message requesting authentication to access the Acme company's VPN. The message is formulated using an Acme-issued user PIN and a secret stored in the embodiment. The request is referred to an authentication server, which stores an "authentication record" that includes a copy of the PIN, a copy of the secret stored at the embodiment, a pointer to the authentication algorithm used for Acme, and a network address for an Acme server, or pointer to a policy that contains rules describing the procedures for handling a request for authentication to the Acme VPN. The server verifies the authentication request and sends the response to the user, who then forwards it to the Acme VPN server. Similarly, the server can verify the request, consult the Acme policy, and follow the rules therein (e.g., send the response to the Acme VPN server directly).

In one embodiment, the authentication code (authenticator) can be generated from a plurality of independent keys. For example, the digits of the authenticator can be generated as follows:

Key 1 is used to generate digits 0 and 1
Key 2 is used to generate digits 2 and 3
Key 3 is used to generate digits 4 and 5
Key 4 is used to generate digits 6 and 7

Additional digits can be included in the authenticator that are not necessarily generated from a key, e.g., a checksum. The embodiment can be provisioned with all or some of the keys. In one embodiment, Keys 1 & 2 are provisioned into a local authentication service (e.g. an authentication server at a customer site), but keep Keys 3 and 4 in the network ("cloud"). A key can also be provisioned into the nexus of a trusted computing system, such as the Palladium system made by the Microsoft Corporation of Redmond, Wash. This combination advantageously allows authentication at both the local level and the cloud level, thereby enhancing the strength and security of the overall system.

Another embodiment can be used to implement a form of biometric authentication. The embodiment can be implemented in a form that is worn or otherwise attached to the user, and which cannot be removed easily without opening it. The wearer authenticates himself to a biometric reader device and provides an authentication code. The authentication code can be PIN- and or time-based. The cloud or a local proxy records this fact and the value of a counter associated with the embodiment. Each subsequent time the embodiment is used to authenticate the user, the counter is incremented. The embodiment can be "used" by automatically reading it or requiring the user to provide an authentication code when a user requests access to a resource (e.g., attempts to log on to a network, attempts to open a door, etc.) The user is presumed to have been biometrically authenticated the next N times the embodiment is used, where N is an integer. Thereafter, the user is not considered to have been biometrically authenticated, and may re-authenticate himself to a biometric authenticator. If the user opens or otherwise removes the embodiment, the counter can be automatically incremented such that the number of remaining biometrically authenticated uses is zero.

While various embodiments have been described above, it should be understood that they have been presented by way of example only, and not limitation. Thus, the breadth and scope of a preferred embodiment should not be limited by any of the above described exemplary embodiments, but should be defined in accordance with the following claims and their equivalents.

What is claimed is:

1. A method comprising:
    receiving, at an authentication device from a user, wherein the authentication device is a mobile device, a first personal identification number;
    retrieving a first cryptographic key from a removable memory coupled to the authentication device, wherein the removable memory is a subscriber identity module (SIM) card;
    generating, at the authentication device, an authentication code based upon the first personal identification number and the first cryptographic key;
    providing the authentication code to an authentication server;
    receiving at the authentication device from the authentication server a second personal identification number through an electronic communication interface coupling the authentication device to the authentication server in response to a correct authentication code, wherein the second personal identification number is different from the first personal identification number; and
    replacing the entire first personal identification number with the second personal identification number at the authentication device, wherein the second personal identification number is later used to authenticate the user.

2. The method of claim 1, further comprising:
    receiving a time from a clock, and wherein the authentication code is also based upon the time.

3. The method of claim 1, further comprising:
    receiving a challenge, and wherein the authentication code is also based upon the challenge.

4. The method of claim 1, further comprising:
    receiving a second cryptographic key if the authentication code is correct, and storing the second cryptographic key at the authentication device.

5. The method of claim 4, wherein the second cryptographic key replaces the first cryptographic key at the authentication device.

6. The method of claim 1, wherein the authentication code is not based on other data received from the user.

7. The method of claim 1, wherein the authentication device comprises of a keypad and a display.

8. The method of claim 1, wherein the authentication device comprises a processor.

9. A non-transitory computer readable medium storing instructions adapted to be executed by a processor to perform operations, the operations comprising:
    receiving, at an authentication device from a user, wherein the authentication device is a mobile device, a first personal identification number;
    retrieving a first cryptographic key from a removable memory coupled to the authentication device, wherein the removable memory is a subscriber identity module (SIM) card;
    generating, at the authentication device, an authentication code based upon the first personal identification number and the first cryptographic key, and wherein the authentication code is not based on other data received from the user;
    providing the authentication code to an authentication server;
    receiving at the authentication device from the authentication server a second personal identification number through an electronic communication interface coupling the authentication device to the authentication server, wherein the second personal identification number is different from the first personal identification number, and wherein the second personal identification number replaces the first personal identification number at the authentication device in response to a correct authentication code; and
    replacing the entire first personal identification number with the second personal identification number at the authentication device, wherein the second personal identification number is later used to authenticate the user.

10. The non-transitory computer readable medium of claim 9, wherein the operations further comprise:
    receiving a time from a clock, and wherein the authentication code is also based upon the time.

11. The non-transitory computer readable medium of claim 9, wherein the operations further comprise:
    receiving a challenge, and wherein the authentication code is also based upon the challenge.

12. The non-transitory computer readable medium of claim 9, wherein the operations further comprise:
   receiving a second cryptographic key if the authentication code is correct, and storing the second cryptographic key at the authentication device.

13. The non-transitory computer readable medium of claim 9, wherein the second personal identification number replaces the first personal identification number at the authentication device, and wherein the authentication code is not based on other data received from the user.

14. The non-transitory computer readable medium of claim 13, wherein a second cryptographic key replaces the first cryptographic key at the authentication device.

15. A method comprising:
   providing, to an authentication token, a first personal identification number, wherein the first personal identification number is used in combination with a first cryptographic key extracted from a removable memory device coupled to the authentication token to authenticate a user with an authentication server and to activate a reader that is communicatively coupled to the authentication server wherein the reader is a mobile device, wherein the removable memory is a subscriber identity module (SIM) card;
   physically and electrically coupling the authentication token to electrical contacts of the reader;
   providing, to the reader, a second personal identification number, wherein the second personal identification number is different from the first personal identification number and replaces the entire first personal identification number at the reader; and
   authenticating the user using the second personal identification number.

16. The method of claim 15, wherein the user is authenticated using the first personal identification number prior to authenticating the user using the second personal identification number.

17. The method of claim 15, wherein the authenticating of the user using the first personal identification number uses a time-based or challenge-response authenticator.

18. The method of claim 15, wherein the authenticating of the user using the second personal identification number includes providing a public key to the authentication server.

19. The method of claim 15, wherein the authenticating of the user using the second personal identification number comprises generating an authentication code based upon the cryptographic key and the second personal identification number.

* * * * *